(12) United States Patent
Farmer

(10) Patent No.: US 6,237,953 B1
(45) Date of Patent: May 29, 2001

(54) AUTOMATIC JACK AND WHEEL CHANGE SYSTEM

(76) Inventor: Dennis E. Farmer, P.O. Box 542, Mt. Gay, WV (US) 26537

( * ) Notice: Subject to any disclaimer, the term of this patent is extended or adjusted under 35 U.S.C. 154(b) by 0 days.

(21) Appl. No.: 09/433,359

(22) Filed: Nov. 4, 1999

Related U.S. Application Data

(60) Provisional application No. 60/127,592, filed on Apr. 2, 1999.

(51) Int. Cl.[7] .................................................. B60S 9/99
(52) U.S. Cl. ............................... 280/763.1; 280/766.1; 254/423; 301/35.61; 301/111
(58) Field of Search ........................... 280/763.1, 6.153, 280/766.1; 301/126, 131, 105.1, 111, 112, 35.61, 35.63; 254/418, 423, 424, 425, 427, DIG. 2

(56) References Cited

U.S. PATENT DOCUMENTS

| | | |
|---|---|---|
| 1,840,824 * | 1/1932 | Sinclair .................................. 301/6.1 |
| 2,244,570 * | 6/1941 | Pignani .............................. 301/35.61 |
| 4,653,727 | 3/1987 | Chang et al. . |
| 4,706,937 | 11/1987 | Chung . |
| 4,872,230 * | 10/1989 | Levine ..................................... 7/100 |
| 4,993,688 | 2/1991 | Mueller et al. . |
| 5,188,379 | 2/1993 | Krause et al. . |
| 5,219,429 | 6/1993 | Shelton . |
| 5,224,688 | 7/1993 | Torres et al. . |
| 5,232,206 | 8/1993 | Hunt et al. . |
| 5,377,957 | 1/1995 | Mosely . |
| 5,636,830 | 6/1997 | Chartrand . |
| 5,713,560 | 2/1998 | Guarino . |
| 5,722,641 | 3/1998 | Martin et al. . |
| 5,765,810 | 6/1998 | Mattera . |
| 5,931,500 * | 8/1999 | Dagnese ............................ 280/766.1 |
| 6,079,742 * | 6/2000 | Spence .............................. 280/766.1 |

* cited by examiner

*Primary Examiner*—J. J. Swann
*Assistant Examiner*—James S. McClellan
(74) *Attorney, Agent, or Firm*—Richard C. Litman

(57) ABSTRACT

An automatic jack and wheel change system having at least one inverted jack driven by an electric motor permanently attached to the vehicle. The system may employ a jack disposed between the front and rear wheel on each side of the vehicle, or it may be equipped with a jack at each of the four wheels. The system also features a novel wheel and hub-axle assembly featuring a split axle whose length may be adjusted by operation of an electric motor. The hub has a plurality of arms extending from the hub in a star-shape, each arm having a finger at its free end. The wheel has a plurality of slots defined therein so that the wheel may be removed by aligning the slots with the arms on the hub and pulling the wheel off when the axle is extended, and a plurality of holes defined therein for receiving the fingers to lock the wheel on the hub when the axle is retracted. Both the motor for raising the jack and the motor for adjusting the length of the axle may be operated by remote control.

8 Claims, 4 Drawing Sheets

AUTOMATIC JACK AND WHEEL CHANGE SYSTEM

CROSS-REFERENCE TO RELATED APPLICATION

This application claims the benefit of U.S. Provisional patent application Ser. No. 60/127,592, filed Apr. 2, 1999.

BACKGROUND OF THE INVENTION

1. Field of the Invention

The present invention relates to automobile jacks and wheel or tire changing systems, and particularly to a remote control system featuring motorized jacks permanently attached to the vehicle, and to a wheel system in which the wheels are not secured by lug nuts, but are removed under motorized control.

2. Description of Related Art

The flat tire is perhaps the most frequently encountered mishap requiring roadside repair of a motor vehicle. The process of changing a flat tire requires jacking up the vehicle, unbolting the lug nuts, removing the wheel, replacing the flat tire with a good spare tire, replacing the lug nuts, and lowering the vehicle to the ground. Unfortunately, many motorists are not mechanically inclined and have not familiarized themselves with where the jack for their car is stored, nor what type of jack it is or how it operates. Occasionally the jack provided by the vehicle manufacturer may prove difficult to operate or not well suited for the vehicle. A further problem is removal of the lug nuts, which is always a messy job, and if the nuts have been overtorqued, may require considerable physical effort. Of course, Murphy's law usually applies, and flat tires usually occur in rush hour traffic and in inclement weather, rendering the chore more hazardous and uncomfortable. A system for jacking the automobile, removing the flat tire, and installing the spare tire which dispenses with the necessity of using tools would therefore be desirable.

A variety of devices have been proposed for making the task of jacking the vehicle and changing a flat tire an easier process. U.S. Pat. No. 4,706,937, issued Nov. 17, 1987 to Y. C. Chung, teaches connecting the transmission pin of a motor driven air compressor to both the compressor and the piston of a hydraulic jack so that the compressor drives both simultaneously to both lift the vehicle and inflate the tire after repair. U.S. Pat. No. 4,993,688, issued Feb. 19, 1991 to Mueller, et al., discloses a built-in power jack, including a pair of pneumatic jacks attached to the vehicle chassis or frame at the center of the front and rear suspension operated by a switch on the dash.

U.S. Pat. No. 5,188,379, issued Feb. 23, 1993 to Krause, et al., shows a leveling system for recreational vehicles which uses four hydraulic jacks located at the corners of the vehicle. U.S. Pat. No. 5,219,429, issued Jun. 15, 1993 to B. E. Shelton, describes a vehicle lifting system which uses a hydraulic jack mounted at each of the four wheels of the vehicle, the jacks being telescoping to permit a smaller size jack. U.S. Pat. No. 5,224,688, issued Jul. 6, 1993 to Torres, et al., also shows a vehicle lift system with separate hydraulic jacks at each of the wheels.

U.S. Pat. No. 5,232,206, issued Aug. 3, 1993 to Hunt, et al., describes pneumatic jacks mounted to the vehicle chassis adjacent the wheels operated from a control panel on the dash. U.S. Pat. No. 5,377,957, issued Jun. 3, 1995 to J. David Mosley, discloses hydraulic jacks mounted at the four corners of the vehicle which may be raised to a horizontal position for storage, and lowered to a vertical position for use.

U.S. Pat. No. 5,636,830, issued Jun. 10, 1997 to L. P. Chartrand, describes a hydraulic lift system with hydraulic cylinders mounted on hydraulic struts which rotate to a horizontal position for storage and a vertical position for use. U.S. Pat. No. 5,713,560, issued Feb. 3, 2998 to J. D. Guarino, describes four hydraulic jacks positioned at the axles and operated from the dash.

U.S. Pat. No. 5,722,641, issued Mar. 3, 1998 to Martin, et al., teaches a tire changing system with a plurality of hydraulic jacks and an air compressor mounted to the vehicle. U.S. Pat. No. 5,765,810, issued Jun. 16, 1998 to F. Mattera, discloses a jacking system with four pneumatic air jacks controlled from a panel on the dash.

U.S. Pat. No. 4,653,727, issued Mar. 31, 1987 to Chang, et al., describes a scissors jack driven by an electric motor mounted on the jack and powered by the vehicle battery by a cigarette lighter plug, operation of the jack being controlled by a switch on a controller disposed in the power line between the motor and the plug. The motor shaft is coupled to the horizontal screw of the jack by a deceleration gear box.

None of the above inventions and patents, taken either singly or in combination, is seen to describe the instant invention as claimed.

SUMMARY OF THE INVENTION

The automatic jack and wheel change system has at least one inverted jack driven by an electric motor permanently attached to the vehicle. The system may employ a jack disposed between the front and rear wheel on each side of the vehicle, or it may be equipped with a jack at each of the four wheels. The system also features a novel wheel and hub-axle assembly featuring a split axle whose length may be adjusted by operation of an electric motor. The hub has a plurality of arms extending from the hub in a star-shape, each arm having a finger at its free end. The wheel has a plurality of slots defined therein so that the wheel may be removed by aligning the slots with the arms on the hub and pulling the wheel off when the axle is extended, and a plurality of holes defined therein for receiving the fingers to lock the wheel on the hub when the axle is retracted. Both the motor for raising the jack and the motor for adjusting the length of the axle may be operated by remote control.

Accordingly, it is a principal object of the invention to provide an automatic jack and wheel change system which eliminates the need for tools to raise a motor vehicle and remove the wheel in order to repair a flat tire.

It is another object of the invention to provide an automatic jack and wheel change system having a jack permanently mounted to a motor vehicle, the jack being operated by an electric motor.

It is a further object of the invention to provide an automatic jack and wheel change system which has a novel wheel and hub-axle assembly eliminating the need for lug nuts to secure the wheel to the vehicle.

Still another object of the invention is to provide an automatic jack and wheel change system in which the vehicle may be raised and the axles may be lengthened for removal of the wheels which may be operated by remote control.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
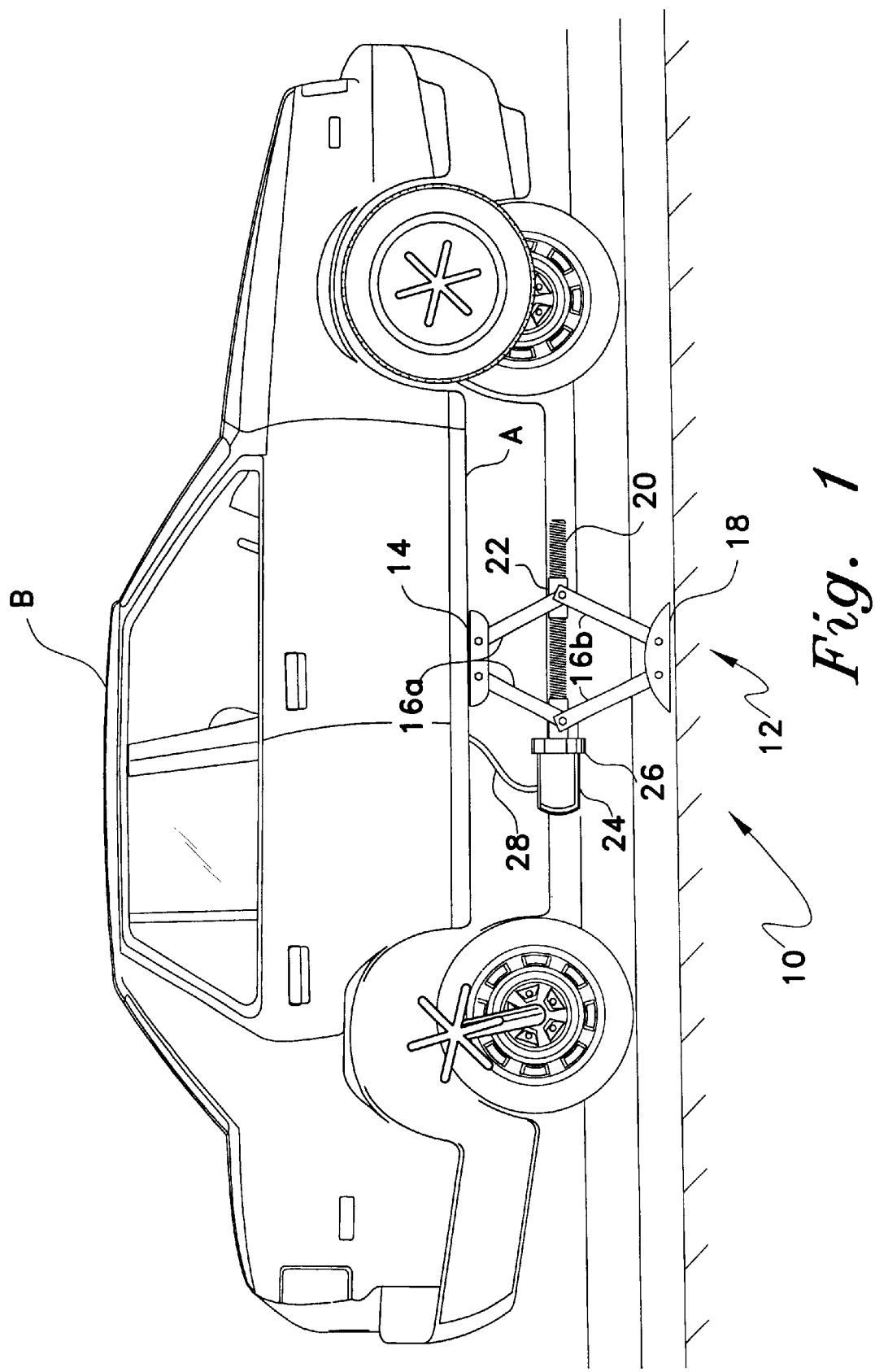
FIG. 1 is an environmental, perspective view of a automatic jack and wheel change system according to the present invention.

The present invention is an automatic jack and wheel change system, designated generally as 10 in FIG. 1. The system 10 includes jacking means attached to the frame of a motor vehicle to raise the vehicle for servicing the wheels. The jacking means may comprise a jack attached to the frame of the vehicle on both sides, or four jacks disposed near the wheels of the vehicle. The jacks are preferably of the mechanical variety and are operated by an electric motor. The jacks are preferably scissors jacks, in order to present a low profile below the frame, but the well known lever and rack type jack may also be used. FIG. 1 shows a view of a vehicle B raised from the ground by jacking means, the rear wheel being removed from the vehicle B.

FIG. 1 shows a preferred embodiment of the invention, including a scissors jack 12 which is inverted and bolted to the chassis A of a motor vehicle B about midway between the front and rear wheels of the vehicle so that a single jack may raise both wheels on the same side of the vehicle. The scissors jack 12 has a U-shaped base 14 bolted to the chassis A. The jack 12 has four lever arms 16, including two lower lever arms 16a and two upper lever arms 16b, defining a parallelogram. The two lower lever arms 16a have a first end pivotally attached to the U-shaped bracket 14 and a second end pivotally attached to a first end of the upper lever arms 16b. The upper lever arms 16b have a second end pivotally attached to a ground engaging plate 18. A horizontal screw 20 extends between the vertices of the parallelogram defined by the junction of the lower 16a and upper 16b lever arms, and is threaded through a nut 22 at one of the vertices. The horizontal screw 20 changes the length of the diagonal of the parallelogram as it rotates through the nut 22, thereby raising and lowering the jack 12.

In accordance with the present invention, rotation of the horizontal screw 20 is powered by an electric motor 24 coupled to the horizontal screw 20 by a gear train 26, which may include planetary gears. The electric motor 24 includes cabling 28 including a power cord attached to the vehicle battery through the fuse box and a switch (not shown). The electric motor 24 is secured to the lever arms 16 of the jack 12 by a mounting bracket or strap (not shown) so that the motor 24 itself does not rotate.

Figure 2:
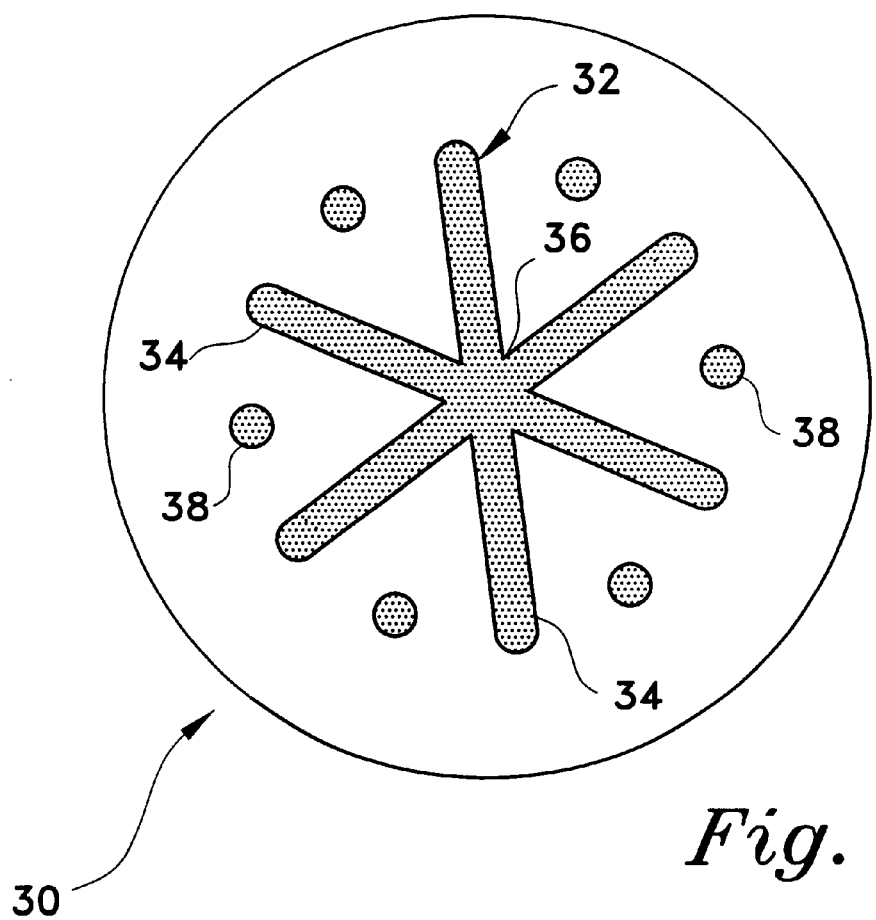
FIG. 2 is a front view of a wheel according to the present invention.
Figure 3:
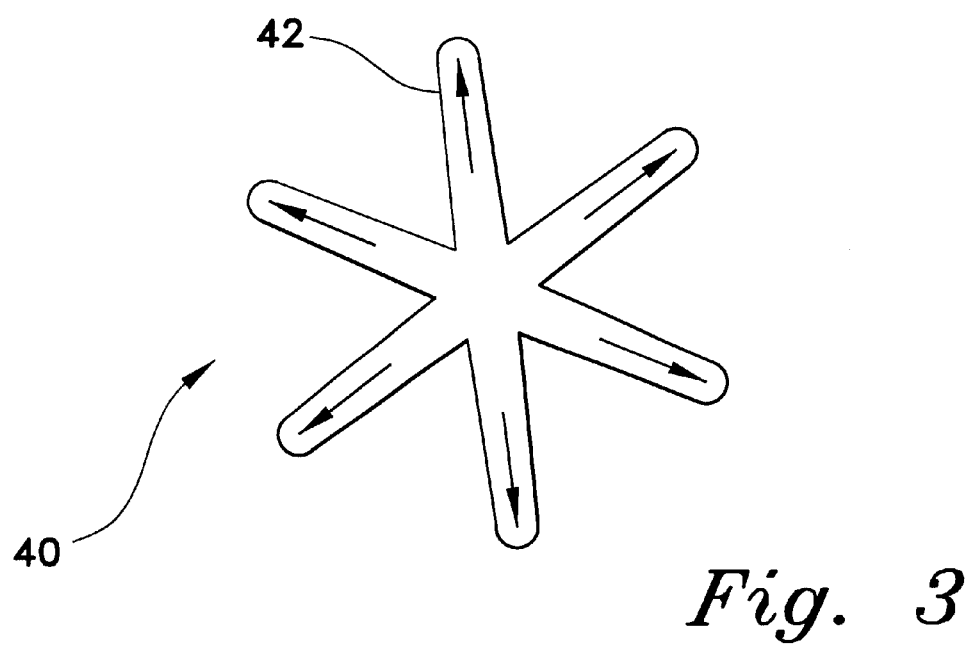
FIG. 3 is a front view of a hub according to the present invention.

The system 10 of the present invention includes a novel wheel and hub-axle assembly which obviates the need for lug nuts and studs to secure the wheel to the axle. FIG. 2 shows a wheel 30 and FIG. 3 shows a hub 40 according to the present invention. The hub 40 includes six arms 42 extending radially from a first section 50a of the axle 50, the arms 42 having generally cylindrical fingers 44 projecting from the free ends, as seen more clearly in FIG. 4. The hub arms 42 are separated by about 60°. The wheel 30 has an aperture 32 defined therein, the aperture 32 including six slots 34 aligned radially about a center 36, the slots 34 being separated by about 60°. The wheel 30 also has six circular holes 38 defined therein, the holes 38 having a diameter slightly greater than the diameter of the fingers 44, the holes 38 being located on the circumference of a circle having a radius about equal to the length of the hub arms 42, the holes 38 being separated by about 60° and being positioned midway between adjacent slots 34. The wheel 30 is mounted on the axle 50 by aligning the hub arms 42 with the slots 34 in the aperture 32, pushing the wheel 30 onto the axle 50 beyond the fingers 44, rotating the wheel to align the fingers 44 with the holes 38, and retracting the axle 50 as set forth below.

Figure 4:
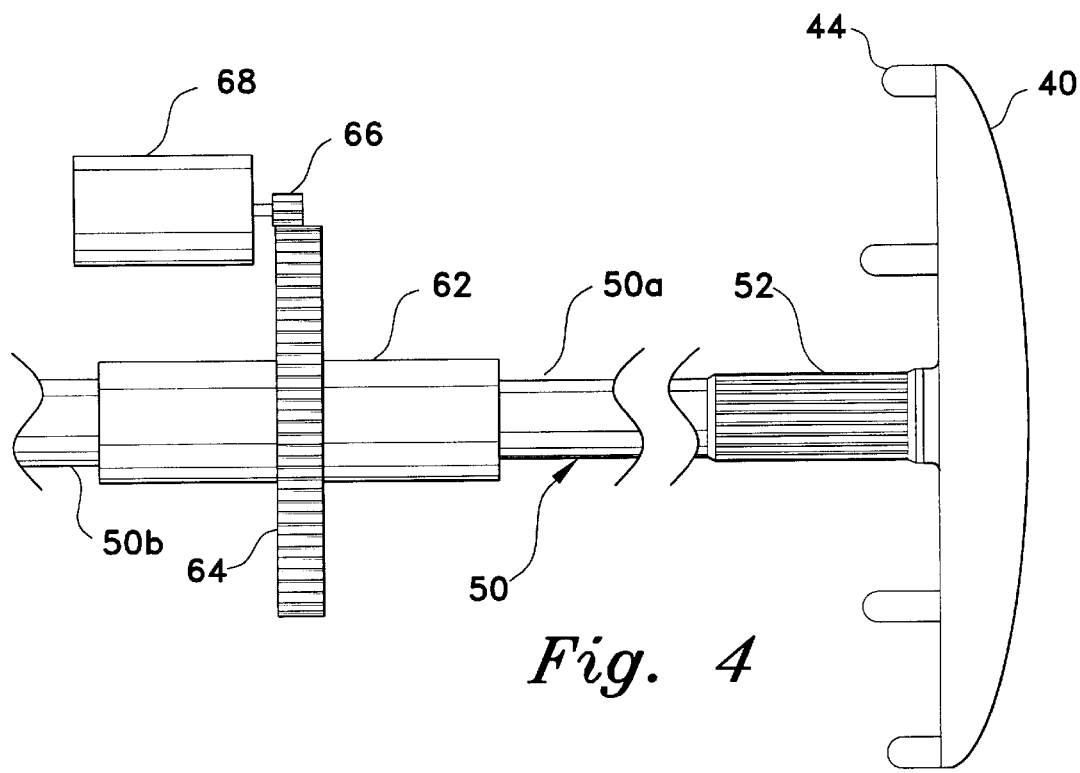
FIG. 4 is a side view of the hub-axle assembly according to the present invention.
Figure 5:
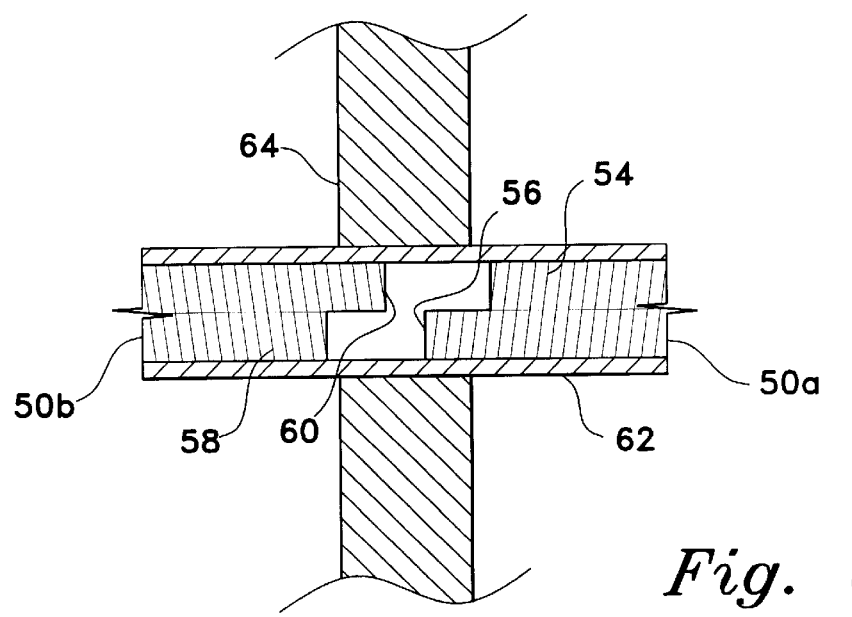
FIG. 5 is a section view of an axle sleeve according to the present invention.

As shown in FIG. 4, the hub-axle assembly includes a split axle 50 having a first section 50a integral with the hub 40, and a second section 50b which may be pivotally attached to the frame A or a steering knuckle (not shown) in the case of a non-drive axle, or which may extend through an axle housing into a differential (not shown) in the case of a drive axle (the brakes, suspension, and steering mechanisms have been omitted from the drawings for clarity). The end of the first section 50a of the axle adjacent the hub 40 is splined 52, as is the interior of the wheel 30 hub (not shown), so that the wheel 30 may slide on and off the axle 50 when the axle is retracted or extended. The opposite end of the first section 50a of the axle is a reverse threaded shaft 54 terminating in a semi-cylindrical stub end 56, shown in FIG. 5. The free end of the second section 50b of the axle is a forward threaded shaft 58 terminating in a semi-cylindrical stub end 60.

The first 50a and second 50b sections of the axle 50 are joined by a hollow, cylindrical, axle sleeve 62 which has a forward threaded portion to receive the second 50b section of the axle, and a reverse threaded portion to received the first section 50a of the axle. Thus, the length of the axle may be increased by rotating the sleeve 62 in one direction, and decreased by rotating the sleeve 62 in the opposite direction, similarly to a tie rod sleeve. When the length of the axle 50 is changed, the first 50a and second sections 50b of the axle must be prevented from rotating, while the sections 50a, 50b are free to move axially. When the length of the axle is shortened by retracting the first section 50a, the stubs 56, 60 are aligned so that the flat faces of the stubs 56, 60 are meshed, preventing independent rotation of the first and second sections, in effect making the axle 50 solid. The first section 50a of the axle may have a stop (not shown) to prevent the wheel 30 from sliding inward on the splines 52 so far that they become disengaged from the fingers 44.

The sleeve 62 has a gear wheel 64 integral with the sleeve 62 and extending radially about its circumference in a plane perpendicular to the sleeve 62 which approximately bisects the sleeve 62. The gear wheel 64 may mesh with a pinion 66 driven by an electric motor 68, as shown in FIG. 4. The motor 68 preferably includes an overrunning clutch (not shown) operated by a solenoid to mesh drive the pinion 66 when a switch is engaged, but which leaves the pinion 66 free running with the gear wheel 64 when the switch is disengaged, similar to the manner in which the starter motor engages the ring gear on the flywheel. Such overrunning clutch mechanisms are well known in the art and will not be described further.

Figure 6:
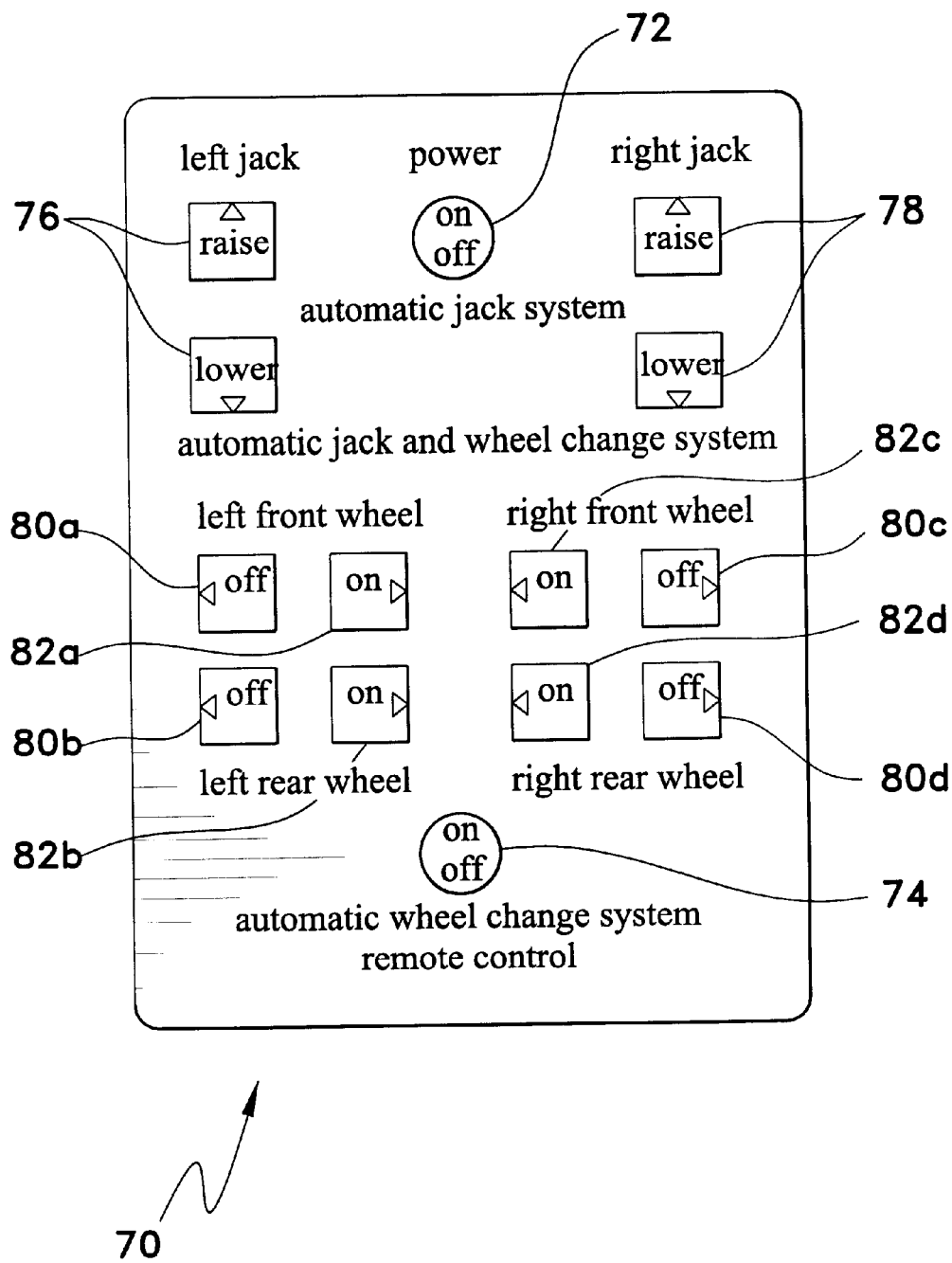
FIG. 6 is a front view of a remote control according to the present invention.

The system includes a remote control 70, as shown in FIG. 6. The remote control 70 may be hardwired to the vehicle's electrical system, or it may operate by optical or radio frequency electromagnetic radiation communicating with sensors in the vehicle B, as is well known in the art. The remote control 70 may also be activated by voice command interpreted by the vehicle's computer control system, as is also well known in the art. The remote control 70 includes a first power on\off switch 72 to supply power to the remote control 70 transmitter for operating the automatic jack 12, and a second power on\off switch 74 to supply power to the remote control 70 transmitter for operating the hub-axle assembly. The control 70 includes at least one switch 76 for raising and lowering a jack 12 on the left side of the vehicle B, and at least one switch 78 for raising and lowering a jack 12 on the right side of the vehicle B. The control 70 further includes separate switches 80a, b, c or d for extending the length of the axle 50 in order to remove the wheel 30 from the left front, left rear, right front, or right rear, respectively, and separate switches 82a, b, c or d for retracting the hubs 40 in order to secure the wheels 30 to the axle 50 at the corresponding locations. The remote control 70 transmits signals to a sensor (not shown) in the vehicle B which is connected to appropriate electrical circuitry for operating the motor 24 in response to switches 76, 78, or electric motor 68 in responses to switches 80a–d, 82a–d.

In operation, when the user wishes to change a tire, the user presses switch 72 to enable the jack controls, and presses the appropriate switch 76 or 78 to lower the left or right jack 12 appropriately. Motor 24 causes screw 20 to rotate, decreasing the length of the diagonal of the parallelogram, bringing plate 18 into engagement with the ground. At this point the user must be careful to lift the vehicle B only enough to relieve the load from the wheels 30 enough for the axle 50 to move linearly in order to lengthen the axle 50, but leaving the tire in sufficient contact with the ground that wheel 30 does not rotate. The user then presses the switch 74 to enable the hub-axle controls, and presses the appropriate switch 80a–d to extend the length of the axle 50. Motor 68 causes sleeve 62 to rotate, extending first section 50a so that the hub 40 is pushed outward from the wheel 30 on splines 52 to disengage fingers 44 from holes 38. The user may then lift the wheels 30 off the ground, rotate the wheels 30 to align slots 34 with arms 42, and pulls the wheel off the axle 50.

The user may then mount the spare tire by pushing the wheel 30 onto the hub 40, rotating the wheel to align the fingers 44 with the holes 38, lowering the jack 12 by pressing the appropriate switch 78 just enough to bring the tire into contact with the ground to prevent wheel 30 from rotating, pressing the appropriate switch 82a–d to retract the hub 40 and seat the fingers 44 in the holes 38, and then retracting the jack 12 by pressing the appropriate switch 78.

It is to be understood that the present invention is not limited to the sole embodiments described above, but encompasses any and all embodiments within the scope of the following claims.

I claim:

1. An automatic jack and wheel change system for a motor vehicle, comprising:
   a) at least one jack adapted to be attached to a frame of the vehicle, the jack being adapted for lifting the vehicle from a ground surface;
   b) a first electric motor having a gear train coupled to said at least one jack for raising and lowering the jack into engagement with a ground surface;
   c) at least one wheel, the wheel having an aperture defined therein, the aperture including a plurality of slots extending radially from a center of the wheel, each wheel further having a plurality of circular holes defined therein, the holes being located on the circumference of a circle concentric with the wheel;
   d) at least one split axle having a first section and a second section connected to each other;
   e) at least one hub having a plurality of hub arms extending radially, each hub arm having a free end and a cylindrical finger extending from the free end, the hub being integral with the first section of said split axle; and
   f) wherein said wheel is mounted on said axle, the hub arms being extendable through the slots defined in said wheel, the fingers being inserted into the holes defined in said wheel, and the axle being retracted to secure the wheel to the axle.

2. The automatic jack and wheel change system for a motor vehicle according to claim 1, further comprising an axle sleeve, the sleeve being hollow and cylindrical, and having an internal forward threaded portion and an internal reverse threaded portion, the first section of said split axle further comprising a reverse threaded shaft engaging the reverse threaded portion of said sleeve, the second section of said split axle further comprising a forward threaded shaft engaging the forward threaded portion of said sleeve, whereby the length of said split axle may be extended and retracted by rotating said axle sleeve.

3. The automatic jack and wheel change system for a motor vehicle according to claim 2, wherein said axle sleeve further comprises a gear wheel integral with said sleeve and extending radially about its circumference in a plane which is perpendicular to said sleeve which approximately bisects said sleeve.

4. The automatic jack and wheel change system for a motor vehicle according to claim 3, further comprising:
   a) a second electric motor; and
   b) a pinion driven by said second electric motor, the pinion meshing with the gear wheel of said axle sleeve and selectively driving said gear wheel when said electric motor is switched on.

5. The automatic jack and wheel change system for a motor vehicle according to claim 4, further comprising a remote control having a plurality of switches for switching said second electric motor in order to change the length of said split axle.

6. The automatic jack and wheel change system for a motor vehicle according to claim 2, wherein:
   a) the first section of said split axle further comprises a semi-cylindrical stub having a flat face terminating the reverse threaded shaft;
   b) the second section of said split axle further comprises a semi-cylindrical stub having a flat face terminating the forward threaded shaft; and
   c) the stub of said first section meshes with the stub of said second section, whereby independent rotation of the first and second sections of said split axle is prevented.

7. The automatic jack and wheel change system for a motor vehicle according to claim 2, wherein the first section of said split axle further comprises a splined portion adjacent said hub, whereby said wheel slides on said hub when said split axle is lengthened.

8. The automatic jack and wheel change system for a motor vehicle according to claim 2, further comprising a remote control having a plurality of switches for switching said first electric motor in order to raise and lower said jack.

* * * * *